(12) United States Patent
Otto et al.

(10) Patent No.: US 10,420,276 B2
(45) Date of Patent: Sep. 24, 2019

(54) SPRAYER WITH AUTOMATICALLY CONTROLLED LATERALLY AND ANGULARLY DISPLACEABLE SPRAY BOOM ASSEMBLY

(71) Applicant: The Toro Company, Bloomington, MN (US)

(72) Inventors: Todd A. Otto, Jordan, MN (US); John R. Kess, Bloomington, MN (US); Steve A. Swinney, II, Hudson, WI (US)

(73) Assignee: The Toro Company, Bloomington, MN (US)

( * ) Notice: Subject to any disclaimer, the term of this patent is extended or adjusted under 35 U.S.C. 154(b) by 168 days.

(21) Appl. No.: 15/052,205

(22) Filed: Feb. 24, 2016

(65) Prior Publication Data

US 2016/0243575 A1    Aug. 25, 2016

Related U.S. Application Data

(60) Provisional application No. 62/119,995, filed on Feb. 24, 2015.

(51) Int. Cl.
*A01C 23/00* (2006.01)
*A01M 7/00* (2006.01)

(52) U.S. Cl.
CPC ............ *A01C 23/00* (2013.01); *A01C 23/008* (2013.01); *A01M 7/0057* (2013.01)

(58) Field of Classification Search
CPC ..... A01C 23/00; A01C 23/008; A01M 7/0057
USPC .............................................. 701/50, 33, 41
See application file for complete search history.

(56) References Cited

U.S. PATENT DOCUMENTS

| 6,073,070 | A | 6/2000 | Diekhans | |
|---|---|---|---|---|
| 7,054,731 | B1 * | 5/2006 | Lange | A01B 69/008 172/4.5 |
| 7,460,942 | B2 * | 12/2008 | Mailer | A01B 69/004 342/357.76 |
| 7,623,952 | B2 * | 11/2009 | Unruh | A01B 69/004 342/357.57 |
| 8,626,408 | B1 * | 1/2014 | Satzler | A01B 69/003 111/18 |
| 2003/0208311 | A1 | 11/2003 | McClure | |
| 2008/0060825 | A1 | 3/2008 | Unruh et al. | |
| 2013/0277442 | A1 * | 10/2013 | Ballu | A01M 7/0057 239/1 |
| 2015/0334916 | A1 * | 11/2015 | Bernier | A01C 23/008 239/71 |

FOREIGN PATENT DOCUMENTS

| EP | 1444879 | 11/2004 |
|---|---|---|
| GB | 2467746 | 8/2010 |

* cited by examiner

*Primary Examiner* — Alexander M Valvis
*Assistant Examiner* — Qingzhang Zhou
(74) *Attorney, Agent, or Firm* — James W. Miller (57) ABSTRACT

A turf sprayer comprises a transport vehicle that carries a laterally extending spray boom assembly. The spray boom assembly is both laterally displaceable and angularly displaceable relative to the transport vehicle. A controller uses a defined path represented by GPS coordinates to control the operation of various actuators to automatically maintain a reference point on the spray boom assembly on the desired path and to automatically maintain the spray boom assembly perpendicular to the desired path.

7 Claims, 9 Drawing Sheets

SPRAYER WITH AUTOMATICALLY CONTROLLED LATERALLY AND ANGULARLY DISPLACEABLE SPRAY BOOM ASSEMBLY

TECHNICAL FIELD

This invention relates to a turf sprayer for spraying a liquid on a turf surface.

BACKGROUND OF THE INVENTION

U.S. Pat. No. 7,364,096 to Sosnowski et al., which is assigned to The Toro Company, the assignee of this invention, discloses a sprayer for applying a liquid, such as a fertilizer, insecticide or herbicide, to a turf surface. The sprayer includes a fixed center boom and a pair of pivotal wing booms that carry spaced spray nozzles along their lengths. In a spray position, the center and wing booms are substantially horizontal and aligned end-to-end along a substantially straight lateral axis with respect to the vehicle that carries the spray booms. In a transport position, the wing booms are folded upwardly and inwardly relative to the center boom until the wing booms become disposed in an X-shaped orientation when they reach the transport position.

Sprayers of this type apply a liquid to relatively large areas of ground or turf surfaces. The operator typically drives the vehicle carrying the spray booms back and forth in a plurality of side-by-side passes over the surface being sprayed. Usually, adjacent passes are driven in opposite directions, the operator making a first pass in one direction, then turning around at the end of the pass, making a second adjacent pass in the opposite direction, and then repeating this back and forth pattern of passes over the entire area of the surface being sprayed. In doing this, the vehicle should be driven as straight as possible so that the swaths of sprayed surface in each pass are aligned with one another as precisely as possible. In other words, the edge of a sprayed swath should match or mate to the nearest edge of the previous sprayed swath so that the entire surface is uniformly sprayed with no parts of the surface being missed by the spray and no parts of the surface being sprayed twice.

However, this is quite difficult for an operator to do. While automatic steering systems are known for controlling the path of a vehicle, such steering systems are quite expensive to use on the types of vehicles, such as vehicles like the Toro Workman® or the Toro Multi-Pro®, which are used as sprayer transport platforms. In addition, most supervisors of the operators of sprayers wish to encourage the operator to keep his or her hands on the steering wheel at all times and to be actively engaged in the operation of the vehicle. Vehicle automatic steering systems are somewhat inconsistent with this goal as they can induce the operator to unduly rely on the steering control provided by the automatic steering system.

One way that operators have attempted to prevent double spraying along the edge of a previously sprayed swath is to try and slightly overlap the edge of the next swath with the previous swath and to manually turn off the nozzle on the sprayer that is closest to the overlapped edge. However, this requires that the operator judge and precisely maintain the right amount of overlap. Despite the use of this technique, there are still areas of the surface that will miss being sprayed when the overlap is too small and that may be sprayed twice if the overlap is allowed to become too large. Moreover, this technique decreases productivity since putting down a swath that is purposely not as large as it could be by turning off the nozzle nearest the edge means that more passes of the vehicle will be necessary to spray a surface of a given size. Such productivity decreases are disadvantageous.

Accordingly, it would be an advance in the sprayer art to provide a sprayer having the ability to precisely apply the spray to a desired surface area to avoid missed or skipped areas and overlapped areas without use of an automatic steering system on the vehicle while maintaining maximum operator productivity.

SUMMARY OF THE INVENTION

One aspect of this invention relates to a sprayer comprising a transport vehicle which carries a laterally extending spray boom assembly for spraying a spray swath of a liquid to a ground or turf surface. The spray boom assembly is laterally displaceable relative to the transport vehicle. At least one first actuator is carried on the transport vehicle and operatively connected to the spray boom assembly for effecting lateral displacement of the spray boom assembly relative to the transport vehicle. A controller is provided for automatically controlling the operation of the at least one first actuator to cause lateral displacement of the spray boom assembly in order to maintain a reference point on the sprayer on a desired path for the reference point during successive passes of the transport vehicle over an area of the ground or turf surface that is to be sprayed.

Another aspect of this invention relates to a sprayer which comprises a transport vehicle that carries a laterally extending spray boom assembly. The spray boom assembly is both laterally displaceable and angularly displaceable relative to the transport vehicle. A controller is provided that uses a defined path represented by navigational coordinates and that further uses heading information of the transport vehicle to cause lateral displacement and angular displacement of the spray boom assembly relative to the transport vehicle to automatically maintain a reference point on the sprayer on the desired path and to automatically maintain the spray boom assembly perpendicular to the desired path despite lateral and angular misalignment of a centerline of the transport vehicle with the desired path.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
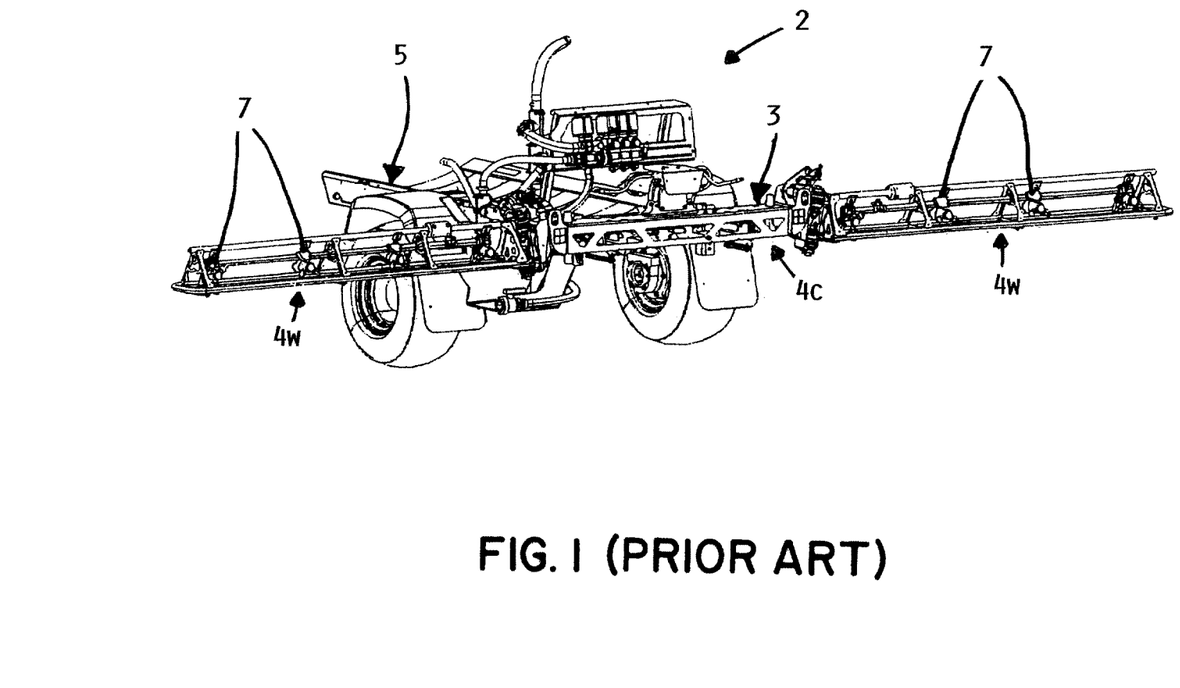
FIG. 1 is a perspective view of a portion of a prior art sprayer for spraying liquids onto a turf surface.

FIG. 1 depicts a portion of the rear of a sprayer 2 previously manufactured and sold by The Toro Company, the assignee of this invention. Sprayer 2 is of the type disclosed in U.S. Pat. No. 7,364,096, also assigned to Toro, which is hereby incorporated by reference.

Referring to FIG. 1 and by way of background, sprayer 2 includes a spray boom assembly 3 comprising a fixed center boom 4c and a pair of wing booms 4w that are pivotally connected to opposite ends of center boom 4c. Each boom 4 carries a plurality of spray nozzles 7 spaced across the length thereof for spraying a liquid, such as a fertilizer, herbicide, pesticide or the like, onto a turf surface. FIG. 1 illustrates booms 4 in a horizontal spray position in which wing booms 4w are unfolded and are aligned end-to-end with center boom 4c such that booms 4 spray liquid over a swath having a width defined by the aggregate length of all booms 4. In the spray position, wing booms 4w extend substantially beyond the sides of a self-propelled vehicle which carries booms 4. To reduce the width of sprayer 2 for transport purposes, wing booms 4w can be pivotally folded up into a compact X-shape (not shown) in which wing booms 4w are behind the vehicle and are disposed above center boom 4c.

Figure 2A:
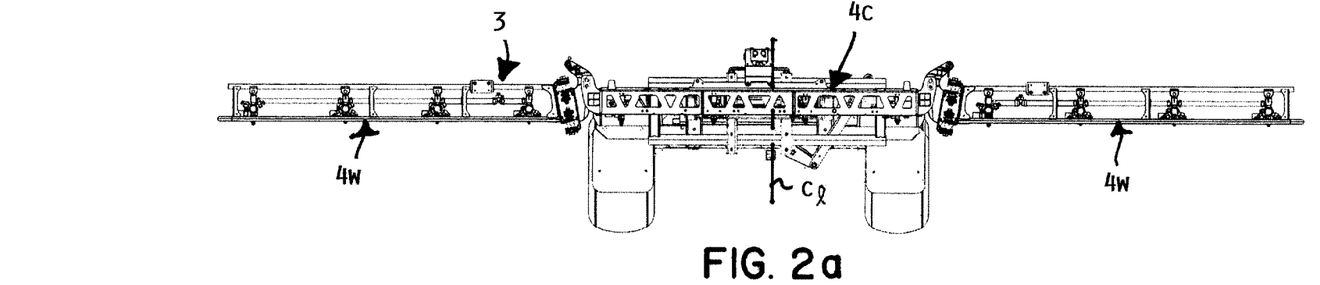
FIGS. 2a, 2b, and 2c are rear elevational views of the laterally displaceable spray boom assembly of a sprayer according to this invention, particularly illustrating the spray boom assembly in a center, left and right position, respectively, relative to a longitudinal centerline of the sprayer.
Figure 2B:
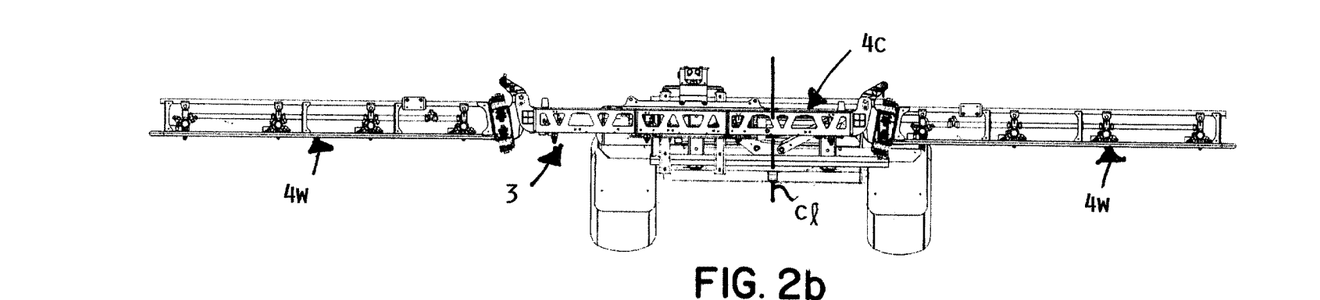
Figure 2C:
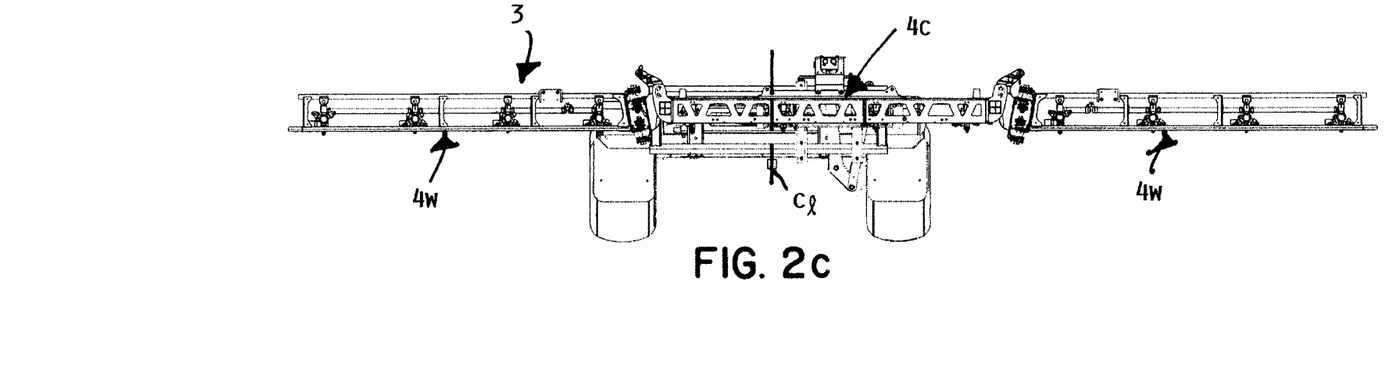

As best shown in FIGS. 2a-2c, boom assembly 3 is laterally displaceable with respect to a forward direction of motion of the vehicle that carries boom assembly 3. FIG. 2a shows boom assembly 3 in a centered position relative to a longitudinal centerline $c_l$ of the vehicle. Boom assembly 3 is capable of being displaced to the left of centerline $c_l$ during operation of the sprayer as shown in FIG. 2b. Similarly, boom assembly 3 is capable of being displaced to the right of centerline $c_l$ during operation of the sprayer as shown in FIG. 2c. The amount of variation to the left or right of centerline $c_l$ is either infinitely variable or variable in very small increments up to a maximum variation, e.g. a maximum variation of approximately 15 inches. The purpose of this variation or lateral displacement of boom assembly 3 is to provide a way of matching a subsequent swath of spray being sprayed in subsequent passes of the sprayer to the swath of spray put down in previous passes as will be described in more detail hereafter.

Figure 3:
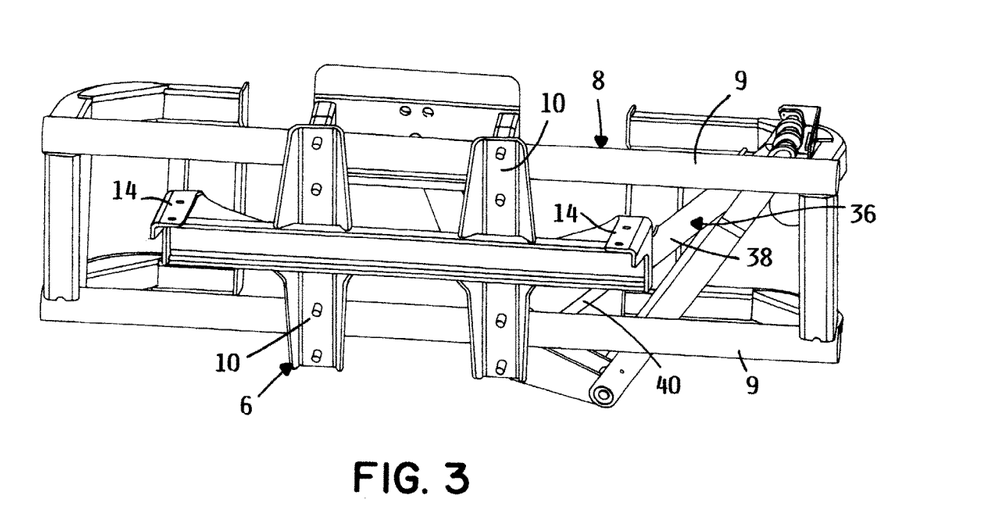
FIGS. 3 and 4 are perspective views of a portion of the laterally displaceable spray boom assembly shown in FIGS. 2a-2c, particularly illustrating the slidable carriage for carrying the spray boom assembly along with a scissors linkage for causing lateral motion of the carriage.
Figure 4:
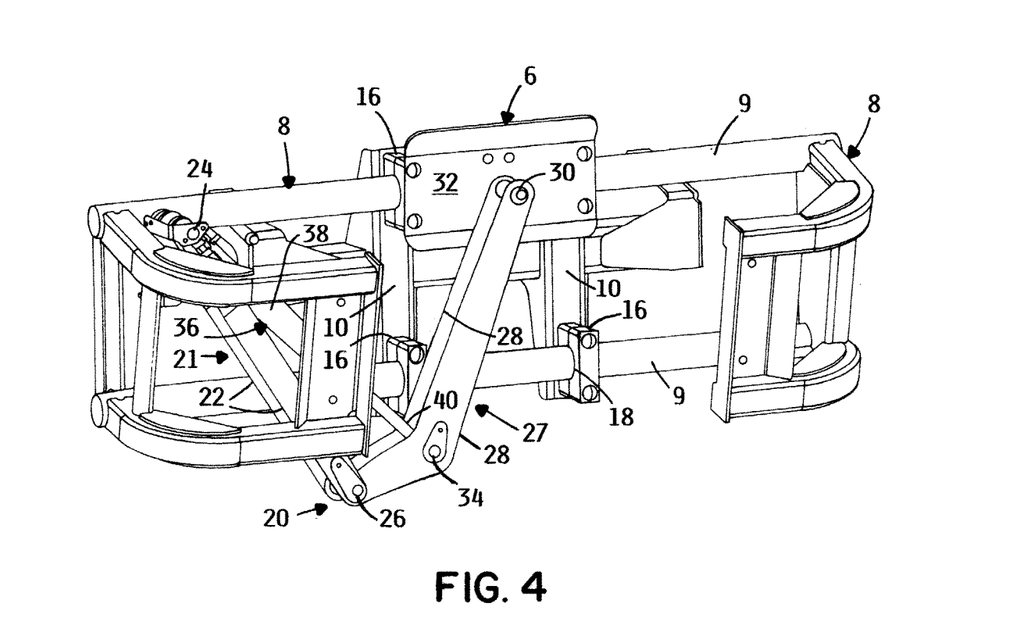

Referring to FIGS. 3 and 4, the mechanism for achieving lateral displacement of boom assembly 3 comprises a slidable carriage 6 provided on a fixed portion 8 of the frame of the vehicle at the rear of the vehicle. Fixed frame portion 8 comprises top and bottom fixed rails 9 that extend laterally from side to side over most of the width of the rear of the vehicle. Carriage 6 comprises a pair of laterally spaced vertical beams 10 that carry rearwardly projecting mounting plates 14 to which center boom 4c of boom assembly 3 may be attached in any suitable way. The tops and bottoms of beams 10 carry blocks 16 that have bores 18 that receive the top and bottom fixed rails 9 of fixed frame portion 8 for slidably mounting carriage 6 on rails 9.

A scissors linkage 20 best shown in FIG. 4 comprises a first pair 21 of link arms 22 that are pivotally connected at their upper ends by a first pivot 24 to one side of fixed frame portion 8 and that are pivotally connected at their lower ends by a second pivot 26 to the lower ends of a second pair 27 of link arms 28. First link arm pair 21 comprises one half of scissors linkage 20 and second link arm pair 27 comprises the other half of scissors linkage 20. The upper ends of second link arm pair 27 are pivotally connected by a third pivot 30 to a rear wall 32 of carriage 6. A hydraulic cylinder 36 extends between first pivot 24 and a fourth pivot 34 provided on second link arm pair 27 near the bottom thereof.

Hydraulic cylinder 36 has a cylinder 38 pivotally connected to fixed frame portion 8 at first pivot 24 with cylinder 38 extending downwardly between the spaced link arms 22 of first link arm pair 21. The end of piston rod 40 of cylinder 38 is then pivotally connected at fourth pivot 34 such that the end of piston rod 40 fits between the spaced link arms 28 of second link arm pair 27. When piston rod 40 is extended out of cylinder 38, scissors linkage 20 is spread further apart to displace carriage 6 towards the left in FIGS. 2b and 3. The opposite action occurs when piston rod 40 is retracted into cylinder 38. In that event, scissors linkage 20 is pulled or retracted back together to displace carriage 6 towards the right in FIGS. 2c and 3. Other actuators, such as linear electric actuators, could be used in place of hydraulic cylinder 36.

Figure 5:
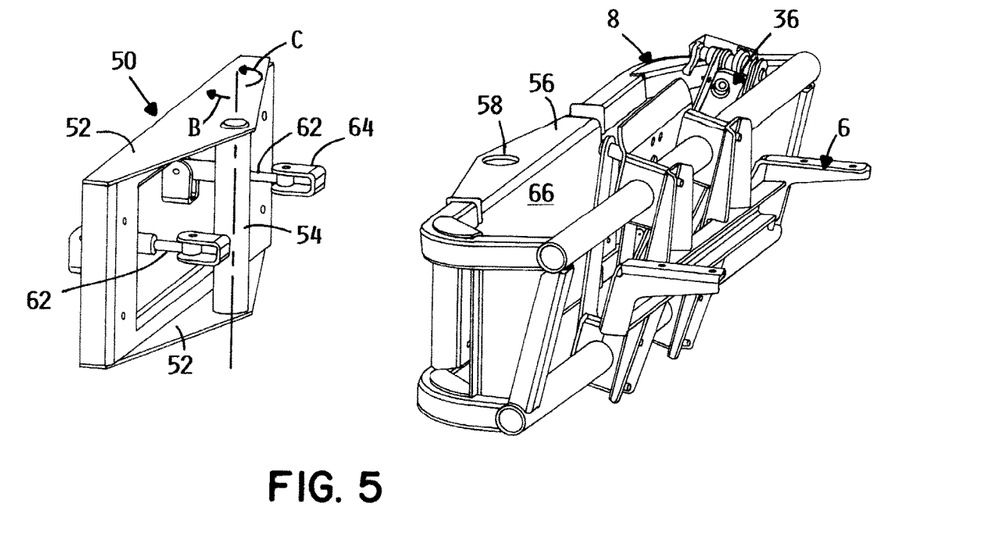
FIGS. 5 and 6 are similar perspective views of the portion of the spray boom assembly shown in FIGS. 3 and 4, particularly illustrating a further enhancement to the spray boom assembly in which the spray boom assembly is additionally angularly displaceable or pivotal about a vertical pivot axis relative to the transport vehicle which carries the spray boom assembly.
Figure 6:
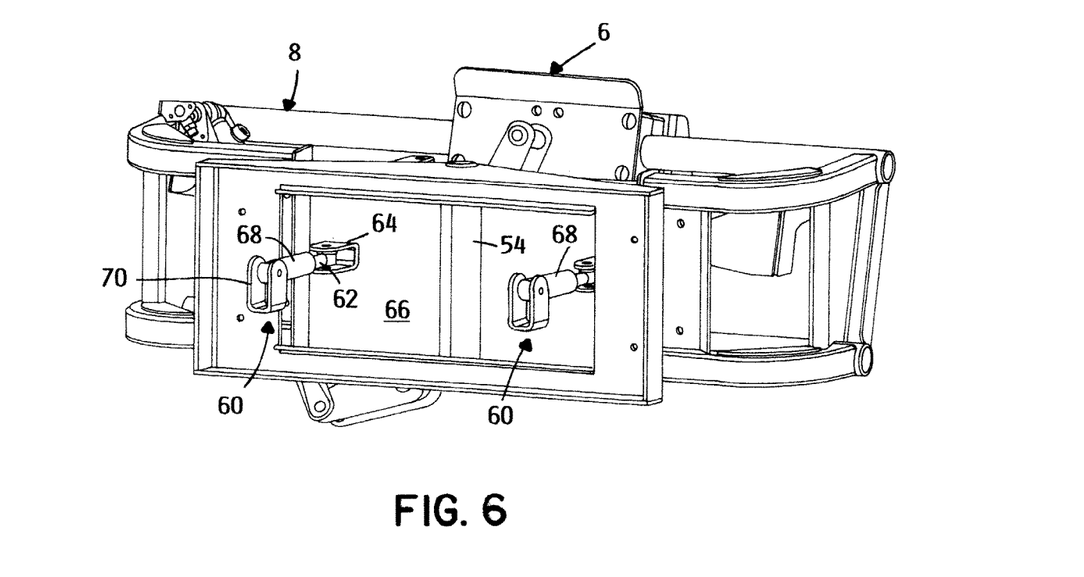

Referring now to FIG. 5, the lateral displacement of boom assembly 3 relative to the vehicle centerline $c_l$ is automatically controlled using global positioning system (GPS) coordinates and a microprocessor based controller (not shown) that is carried on sprayer 2 and receives such coordinate information. The controller uses such GPS information to continuously and automatically control the lateral position of boom assembly 3 through hydraulic cylinder 36 by either extending or retracting piston rod 40 of cylinder 38 as need be. The use of GPS could be supplemented with an inertial measurement unit (IMU) that fills in when GPS is denied. In addition, alternative navigational systems to the use of GPS include radio-based navigation systems including UWB (ultra wide band), dead reckoning systems (alone, or supplemented with an IMU), or laser-based systems such as SLAM (simultaneous localization and mapping).

However, with respect to use of GPS and taking the typical situation where a ground or turf surface is to be sprayed with a liquid, the operator can drive the vehicle carrying the sprayer in a first or teaching pass along one side or boundary of the sprayer. The controller is able to receive and store the GPS coordinates of the center 42 of boom assembly 3 during this first pass, or of any other desired reference spot on the sprayer or the vehicle carrying the sprayer, to learn or remember the GPS positioning of boom center 42 during the first or teaching pass. Once this is known, the controller can then compute the GPS positioning needed for the second pass which is simply the GPS positioning of the first pass plus the width of boom assembly 3 assuming that all the nozzles are on and boom assembly 3 is spraying a full width swath. Using this computed GPS positioning for the second pass, the controller can automatically displace boom assembly 3 to the left or the right, by controlling hydraulic cylinder 36 in a feedback control loop, or leave boom assembly centered if need be so that the swath being laid down by boom assembly 3 in the second pass matches or mates with the swath in the first pass to eliminate or greatly reduce any spots that are missed by the spray or that are double sprayed. The same automatic control of the lateral position of boom assembly 3 will be used in all subsequent passes with the exception that the GPS positioning for the subsequent passes will be computed by the controller to account for the number of boom widths that such subsequent passes are beyond the first pass.

Figure 7:
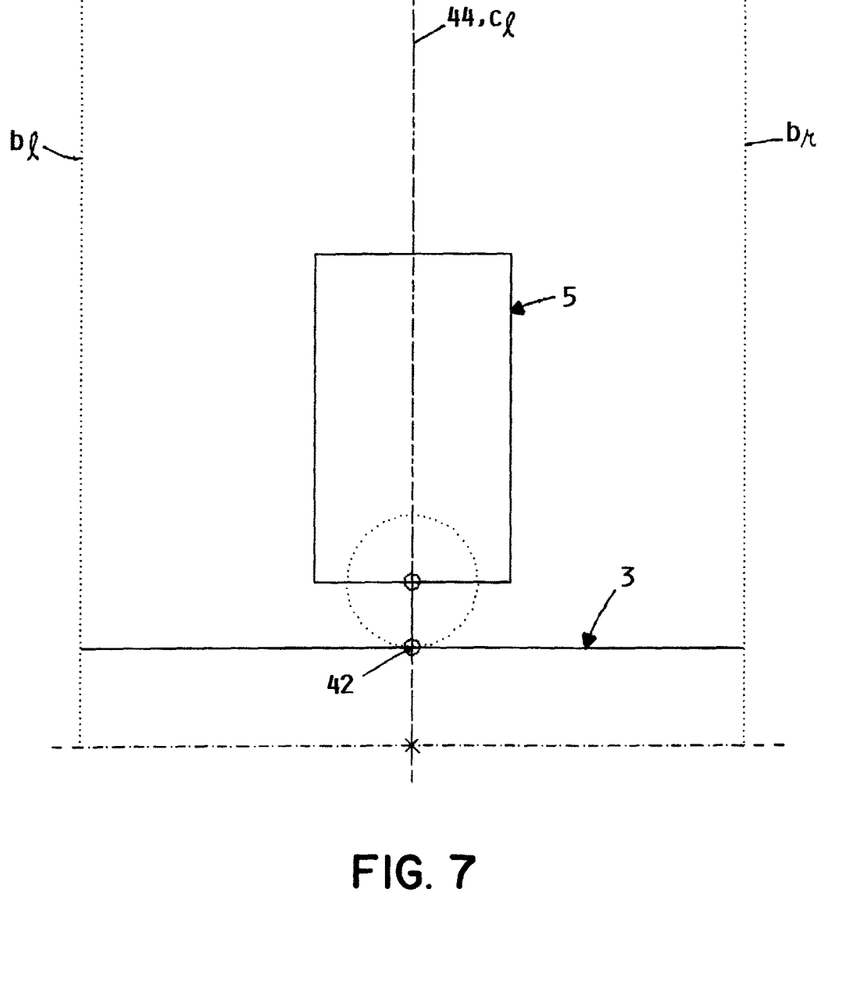
FIGS. 7-11 are diagrammatic operational views illustrating both lateral and angular displacements of the spray boom assembly relative to the transport vehicle needed to make spray swath location corrections when the transport vehicle is laterally or angularly offset from a desired path.
Figure 8:
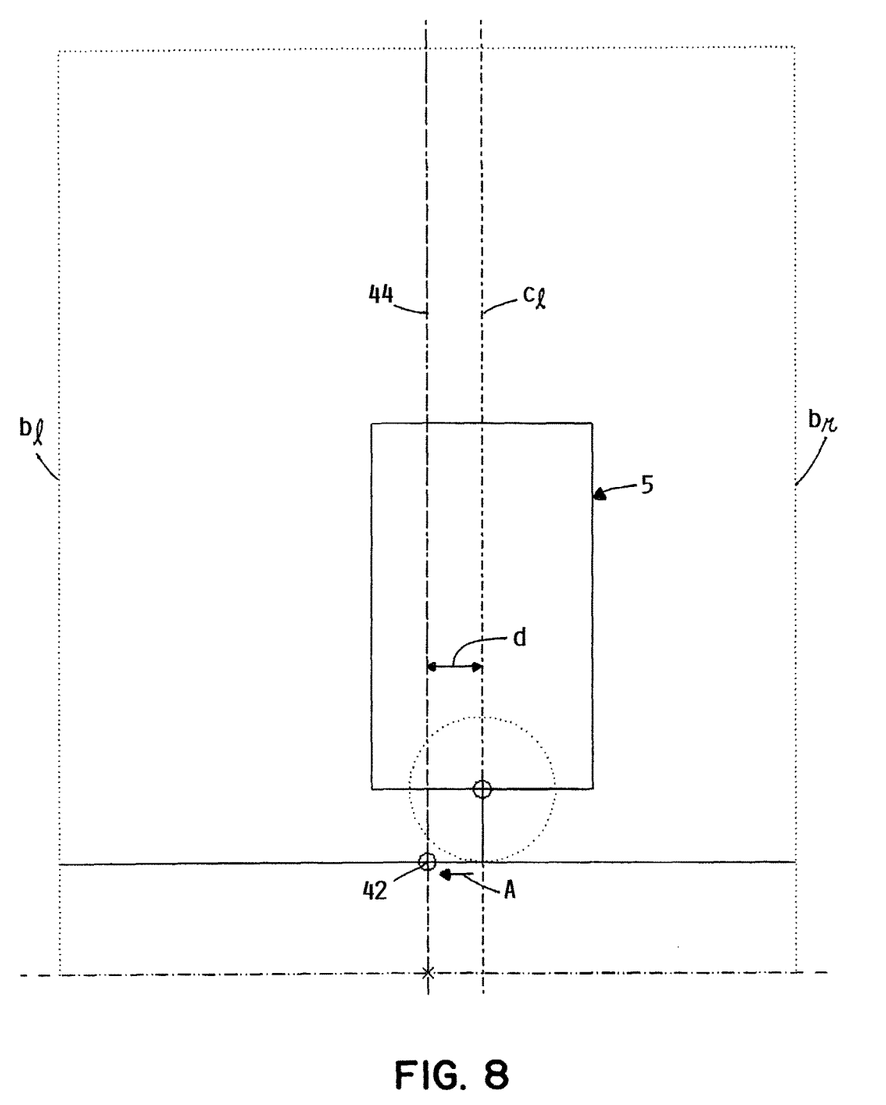

The methodology involved in controlling the lateral displacement of boom assembly 3 is diagrammatically illustrated in FIGS. 7 and 8. In each of these figures, the desired path to be followed by boom center 42 during a subsequent pass of vehicle 5 over an area to be sprayed, namely during any pass beyond the first or learning pass, is represented by line 44. When boom center 42 is on desired path 44, the spray pattern being delivered by boom assembly 3 will spray a swath extending between a desired left boundary line $b_l$ and a desired right boundary line $b_r$. FIG. 7 illustrates this situation. Vehicle 5 is driving parallel to and is centered on desired path 44 such that vehicle centerline $c_l$ overlies desired path 44 with the result that boom center 42 also overlies desired path 44. The result is that the spray path being laid down by boom assembly 3 is right where it should be in terms of mating with the prior pass, i.e. the spray at left boundary line $b_l$ in the current pass is immediately contiguous to the spray that was put down at right boundary line $b_r$ in the prior pass without spray overlap or spray gaps therebetween.

FIG. 8 illustrates what happens when vehicle 5 is driving parallel to desired path 44 but becomes laterally offset to the right by a distance d from desired path 44. As the controller compares the instantaneous GPS coordinates of boom center 42, or any other chosen reference spot, to the GPS coordinates of desired path 44, the controller is able to detect the error and computes the error difference between the two. The controller then sends a correction signal to hydraulic cylinder 36 to laterally slide boom assembly 3 in the appropriate direction needed to correct the lateral displacement error and move boom center 42 back to desired path 44. This is illustrated by the arrow A in FIG. 8 which depicts the leftward sliding of boom assembly to compensate for the rightward lateral displacement of vehicle 5 from desired path 44.

The advantage of the above is that it accomplishes spraying of the entire area of the surface to be sprayed without requiring that any nozzles be shut off such the full spray width of the sprayer can be used to maximize productivity. In addition, it does not take the operator out of the equation. The operator still needs to drive the vehicle in a generally straight line during each pass along approximately the path he or she needs to drive, but there is no absolute need for precision by the operator. As long as the operator is driving the vehicle within the maximum lateral displacement of boom assembly 3, the automatic lateral displacement of boom assembly 3 will continuously make any corrections that are needed. Since most operators can drive to within a few inches of the path that is needed using visual driving aids that are commonly employed with respect to sprayers, i.e. a line of foam or a marker dye dropped by one side of boom assembly 3 to mark the edge of the last pass, the approximately 15 inch maximum variability in the position of boom assembly 3 gives more than enough leeway to the operator.

Another alternate control system and method that does not rely on GPS coordinates is a vision based system. In this vision based system, a foam or dye marker is dropped along one edge of each pass made by vehicle 5 over the area to be sprayed, namely over both the first pass as well as each subsequent pass. A vision sensor (not shown) is provided on boom assembly 3 or some other portion of the sprayer or vehicle which vision sensor reads or senses the foam or dye line. This sensed visual information is then used as the basis for automatically controlling the lateral position of boom assembly 3. For example, if the vision sensor detects and reports that the offset of the centerline $c_l$ from the foam or dye line is below the desired value, then the controller will automatically use hydraulic cylinder 36 to laterally slide boom assembly 3 away from the foam or dye line until the correct and desired value is reestablished. The reverse happens if the foam or dye line is determined to be further away from the desired value. Then the controller laterally slides boom assembly 3 back towards the foam or dye line.

FIGS. 5 and 6 depict an optional enhancement that is nonetheless preferably used in sprayer 2 to further increase the accurate control of boom assembly 3 in properly applying the spray swath in subsequent passes to the spray swath in earlier passes. In the earlier embodiment described in connection with FIGS. 3, 4, 7 and 8, vehicle frame portion 8 that carries laterally slidable carriage 6 on which boom assembly 3 is carried is itself fixed or rigid with respect to vehicle 3. If vehicle 5 is not being driven parallel to desired path 44, then boom assembly 3 will not be perpendicular relative to desired path 44 but will be cocked or canted relative to desired path. This angular displacement of boom assembly 3 relative to its nominal perpendicular orientation relative to desired path 44 will cause the spray path to miss and/or overlap the desired swath it is intended to cover. Thus, the enhancement of FIGS. 5 and 6 is intended to provide boom assembly 3 with angular adjustability relative to desired path 44 in addition to its lateral adjustability.

Referring now to FIGS. 5, and 6, frame portion 8 that carries boom assembly 3 is no longer rigidly fixed to the frame of vehicle 5, but is coupled to vehicle 5 by a vertical pivot mount 50. FIG. 5 illustrates mount 50 in an exploded form relative to frame portion 8 and slidable carriage 6 carried by frame portion 8. Mount 50 includes rearwardly facing, vertically spaced, mounting flanges 52 that carry a vertical pivot pin 54 extending therebetween. The rear of frame portion 8 includes forwardly facing, vertically spaced, support flanges 56 having bores 58. Only the upper support flange 56 and its bore 58 are shown in FIG. 5 with the lower support flange 56 and its bore 58 being hidden in FIG. 5.

When frame portion 8 and mount 50 are assembled together, support flanges 56 nest within mounting flanges 52 with bores 58 being pivotally received on pivot pin 54. This provides angular or pivotal adjustability of frame portion 8 relative to vehicle 5 about the axis of pivot pin 54 as represented by arrows B and C in FIG. 5. The lateral adjustability of boom assembly 3 works as it always did since carriage 6 is still slidable on frame portion 8 in the same way as previously described. However, all of this structure (frame portion 8, carriage 6, boom assembly 3, etc.) now is angularly adjustable relative to vehicle 5 due to the addition of pivot mount 50 between this structure and vehicle 5.

A pair of horizontally extending, hydraulic cylinders 60 have the free ends of their piston rods 62 pivotally attached by clevises 64 to a rear wall 66 of frame portion 8. Clevises 64 are laterally spaced on either side of pivot pin 54 in a push-pull manner. As one piston rod 62 is extended the other piston rod 62 is simultaneously retracted to apply force to frame portion 8 to pivot frame portion 8 about pivot pin 54. Using two hydraulic cylinders 60 in this push-pull manner better stabilizes frame portion 8 and the rest of the structure carried by frame portion 8 during angular adjustment thereof. Cylinders 68 of hydraulic cylinders 60 are connected by clevises 70 to a fixed portion of the rear frame of vehicle 5. Hydraulic cylinders 60 are controlled by the same controller that controls the operation of hydraulic cylinder 36 to provide lateral displacement of boom assembly 3.

Other types of actuators could be used in place of hydraulic cylinders 60. In addition, only a single hydraulic cylinder 60 could be used in place of the dual hydraulic cylinders 60 illustrated herein.

Figure 9:
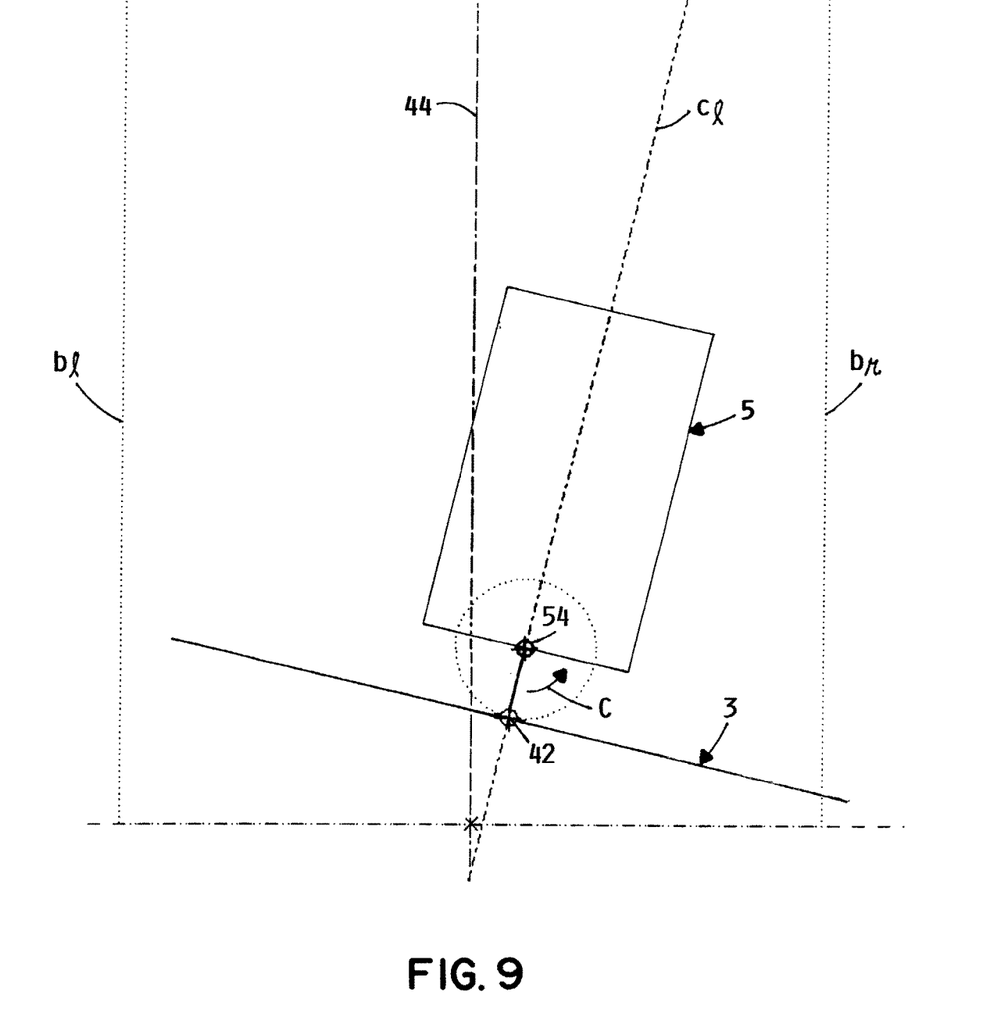

Referring now to FIG. 9, a situation is depicted in which vehicle 5 is not being driven parallel to desired path 44 as indicated by the angular displacement of vehicle centerline $c_l$ relative to desired path 44 and boom center 42 is also laterally displaced from desired path 44. In this event, it is necessary to both angularly displace boom assembly 3 to return boom assembly 3 to a perpendicular orientation relative to desired path 44 as illustrated in FIG. 10 as well as laterally displace boom assembly 3 to return boom center 42 to desired path 44 as illustrated in FIG. 11.

In making the angular adjustment or displacement of boom assembly 3, the controller uses the GPS coordinates that define desired path 44 as sensed and stored from the first or learning pass described earlier for use in creating desired path 44 as the baseline for the lateral adjustment of boom assembly 3. The controller would then compute a set of compass headings along desired path 44 required for vehicle 5 to travel parallel to desired path 44 in each subsequent pass. As vehicle traverses along desired path 44 in each subsequent pass, the controller would compare the instantaneous vehicle heading to the stored reference heading at that point in the pass. If there is a difference between the two headings, then the controller would send a correction signal to hydraulic cylinders 60 to extend piston rod 62 of one cylinder 60 and retract piston rod 62 of the other cylinder 60 to cause boom assembly 3 to pivot about pivot pin 54 in the appropriate direction to again become perpendicular to desired path 44. The arrow C in FIG. 9 is the direction boom assembly 3 must pivot in the situation being depicted in FIG. 9. This pivoting action in the direction of arrow C continues until boom assembly 3 is again oriented perpendicular to desired path 44 as shown in FIG. 10.

Figure 10:
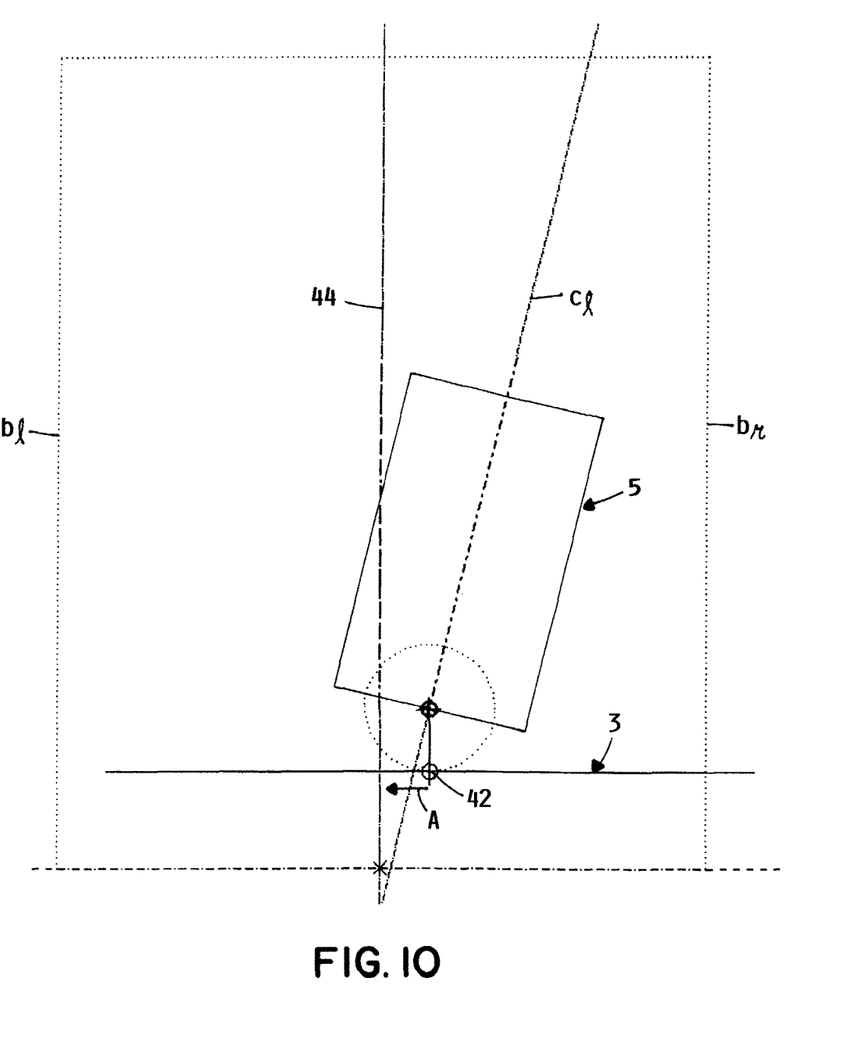
Figure 11:
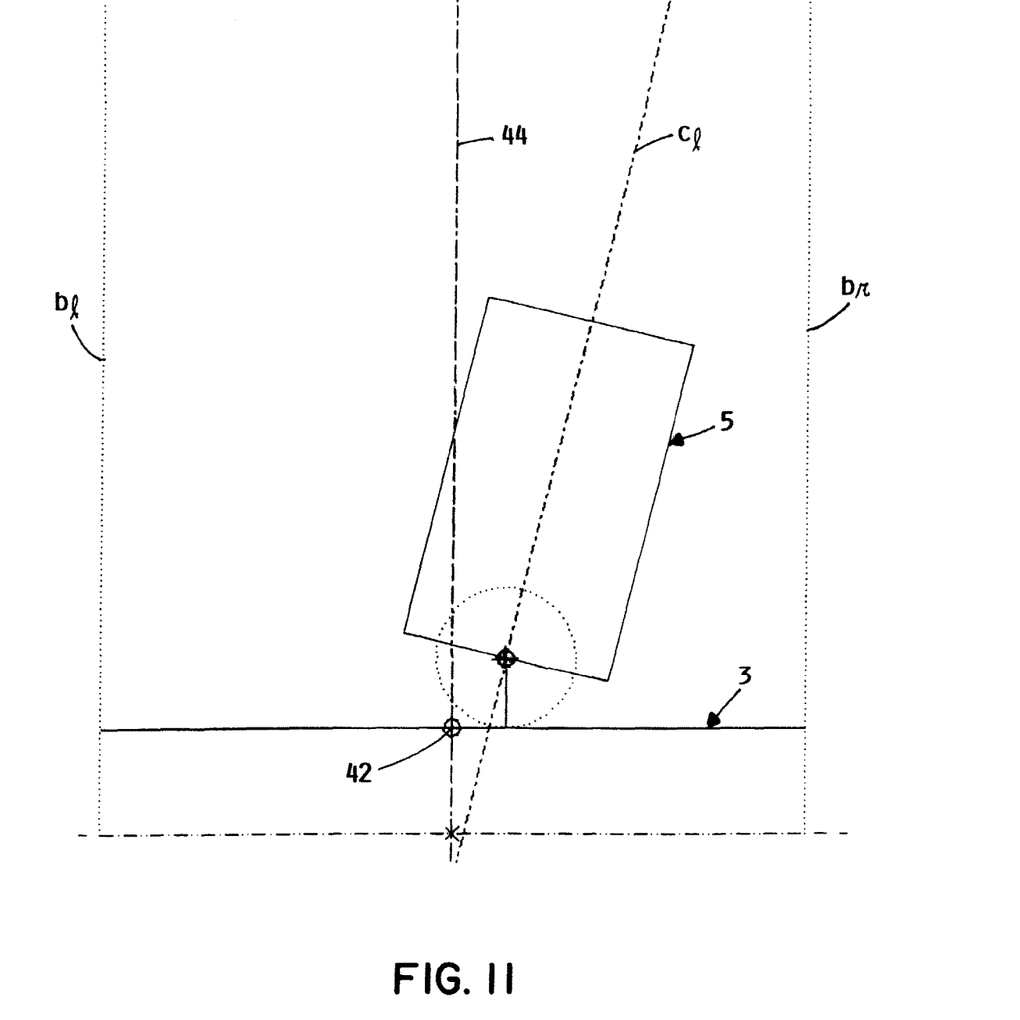

However, as is quite apparent from FIG. 10, boom center 42 is still laterally displaced from desired path 44. Thus, a lateral displacement correction of boom assembly 3 is then made as described with respect to FIGS. 7 and 8 to move boom center 42 back to desired path 44. In the situation depicted in FIG. 10, this requires sliding boom assembly 3 back in the direction of arrow A in FIG. 10. The sliding displacement continues until boom center 3 is again overlaid on desired path 44 as shown in FIG. 11. Thus, the spray path defined by boom assembly 3 is again where it should be extending between boundary lines $b_l$ and $b_r$ even with vehicle 5 temporarily being driven at an incorrect heading. Thus, by adding the feature of angular adjustment of boom assembly 3 as described above to the earlier described feature of lateral adjustment of boom assembly 3 the positioning of the spray path relative to the desired boundary lines is enhanced and made more accurate.

In making the angular and lateral adjustments of boom assembly 3, the angularity adjustment has been described as being made first followed by the lateral adjustment. This could obviously be reversed if so desired. In addition, both adjustments could also be made substantially simultaneously.

Various modifications will be apparent to those skilled in the art. For example, the numbers of booms 4 that are provided in the boom assembly 3 can obviously vary from the three booms shown herein. In addition, the swath matching technology described above in connection with sprayer 2 could be used in connection with other "swath-based" turf maintenance or working operations, e.g., mowing, aerating, top dressing, granular or particulate fertilizer application, scarifying, and the like. In such alternative uses, the tools or implements that perform the turf maintenance or working operations would be laterally displaceable and/or angularly displaceable and automatically controlled as described above with respect to boom assembly 3.

Thus, the scope of this invention is not to be limited to the particulars of the one embodiment of the invention that has been disclosed herein. Accordingly, the scope of this invention is to be limited only by the appended claims.

The invention claimed is:

1. A turf surface sprayer, which comprises:
    (a) a transport vehicle which carries a laterally extending spray boom assembly for spraying a spray swath of a liquid onto a turf surface and which further carries a tank that holds a supply of the liquid that is to be sprayed by the spray boom assembly, the transport vehicle carrying the spray boom assembly above and out of contact with the turf surface during a spraying operation, the spray boom assembly being laterally displaceable relative to the transport vehicle and relative to the tank during the spraying operation;
    (b) wherein the spray boom assembly comprises a center boom and a pair of wing booms that are pivotally connected to opposite ends of the center boom, wherein the wing booms are substantially aligned end-to-end with the center boom during the spraying operation such that the booms collectively spray liquid over an unbroken swath that is wider than a swath that would be sprayed by any single boom, and wherein the center boom is slidably coupled to the transport vehicle such that the lateral displacement of the spray boom assembly results from side-to-side sliding of the center boom relative to the transport vehicle with the side-to-side sliding of the center boom serving to simultaneously slide the wing booms from side-to-side in concert with the center boom;
    (c) at least one first actuator carried on the transport vehicle operatively connected to and acting between the transport vehicle and the center boom of the spray boom assembly for effecting lateral displacement of the spray boom assembly relative to the transport vehicle and relative to the tank during a spraying operation, wherein the spray boom assembly and the at least one first actuator are carried together on a pivotal frame portion of the transport vehicle that is angularly pivotal relative to a remainder of the transport vehicle about a substantially vertical pivot axis provided on the transport vehicle;
    (d) at least one second actuator carried on the transport vehicle operatively connected to and acting between the remainder of the transport vehicle and the pivotal frame portion for angularly displacing the pivotal frame portion including the spray boom assembly and the at least one first actuator carried on the pivotal frame portion about the vertical pivot axis; and
    (e) a controller for automatically controlling the operation of the at least one first actuator to cause lateral displacement of the spray boom assembly in order to maintain a reference point on the sprayer substantially on a desired path for the reference point during successive passes of the transport vehicle over an area of the turf surface that is to be sprayed, wherein the controller further automatically controls the operation of the at least one second actuator to cause angular displacement of the pivotal frame portion about the vertical pivot axis in order to maintain the spray boom assembly substantially perpendicular relative to the desired path during the successive passes of the transport vehicle over the area of the turf surface that is to be sprayed.

2. The sprayer of claim 1, wherein the at least one second actuator comprises two second actuators that extend between the remainder of the transport vehicle and the pivotal frame portion on opposite sides of the vertical pivot axis in order to operate in a push-pull manner in achieving the angular displacement of the pivotal frame portion.

3. The sprayer of claim 1, wherein the reference spot is a lateral center of the spray boom assembly.

4. The sprayer of claim 1, wherein the side-to-side sliding of the center boom and the wing booms that comprises the lateral displacement of the spray boom assembly comprises a substantially linear motion along a side-to-side axis that is fixed relative to the transport vehicle.

5. The sprayer of claim 4, wherein the linear motion is produced by a linkage assembly which comprises:
  (a) a first linkage having a first end pivotally connected to the transport vehicle;
  (b) a second linkage having a first end pivotally connected to the center boom of the spray boom assembly;
  (c) the first and second linkages having second ends pivotally connected to one another; and
  (d) the at least one first actuator having an extendible and contractible operative length, the at least one first actuator increasing a distance between the first ends of the first and second linkages to laterally displace the spray boom assembly relative to the transport vehicle in a first direction when the operative length of the at least one first actuator is extended and for decreasing the distance between the first ends of the first and second linkages to laterally displace the spray boom assembly relative to the transport frame portion in a second direction that is opposite to the first direction when the operative length of the at least one first actuator is contracted.

6. The sprayer of claim 5, wherein the at least one actuator is a single actuator having one end pivotally connected to the transport vehicle at the pivot connection between the first end of the first linkage and the transport vehicle, and wherein the single actuator has a second end pivotally connected to the second linkage at a pivot point that is spaced from the pivot connection between the first end of the second linkage and the center boom of the spray boom assembly.

7. The sprayer of claim 6, wherein the first and second linkages comprise pairs of spaced first and second link arms, and wherein the single actuator is positioned between the pairs of first and second link arms.

\* \* \* \* \*